United States Patent [19]

Akamatsu

[11] 3,854,890
[45] Dec. 17, 1974

[54] PLASTIC ARTICLE HAVING A SURFACE CONSISTING OF METAL PLATED AND COLORED NON-PLATED PORTIONS

[75] Inventor: Akiyuki Akamatsu, Yokohama, Japan

[73] Assignees: Showa Denko K. K.; Toyo Kako Co., Ltd., both of Tokyo, Japan

[22] Filed: Oct. 11, 1972

[21] Appl. No.: 296,538

Related U.S. Application Data

[63] Continuation-in-part of Ser. No. 107,577, Jan. 18, 1971, abandoned.

[30] Foreign Application Priority Data

Jan. 20, 1970  Japan.................................. 45-4829
Mar. 19, 1970  Japan................................ 45-22627
May 15, 1970  Japan................................ 45-41149
June 3, 1970  Japan................................. 45-47469

[52] U.S. Cl. ............................................. 29/195
[51] Int. Cl. ......................................... B32b 15/08
[58] Field of Search................................. 29/195 P

[56] References Cited
UNITED STATES PATENTS
2,662,033  12/1953  Andrew .............................. 117/8
3,474,728  10/1969  Lenz et al. ........................ 101/395
3,554,780  1/1971  Miller et al. ........................ 117/5.5
3,591,352  7/1971  Kennedy et al. ................. 29/195 P

*Primary Examiner*—L. Dewayne Rutledge
*Assistant Examiner*—E. L. Weise
*Attorney, Agent, or Firm*—Kemon, Palmer & Estabrook

[57] ABSTRACT

The plastic article according to the present invention has a surface partially metal plated and partially non-plated and colored. Said color designed and non-plated portions of the article surface are obtained by selectively forming on the surface of the article of a polymer containing butadiene units a protective film containing a coloring material and a synthetic resin selected from the group consisting of polyvinyl chloride, polyvinyl acetate, vinylchloride-vinyl acetate copolymers and ethylene-vinyl acetate copolymers, and said synthetic resin occupying more than 60 weight percent of the protective film, and by treating said plastic article with an etching solution containing at least 50 g/l $CrO_3$.

5 Claims, No Drawings

PLASTIC ARTICLE HAVING A SURFACE CONSISTING OF METAL PLATED AND COLORED NON-PLATED PORTIONS

CROSS-REFERENCE TO RELATED APPLICATION

This is a Continuation-in-part of U.S. Pat. application Ser. No. 107,577, filed Jan. 18, 1971 now abandoned.

BACKGROUND OF THE INVENTION

The present invention relates to a plastic article having a metal plated surface that is ornamented up unplated areas that present a colored design.

In recent years, there have been increasingly accepted metal plated plastic articles presenting substantially the same external appearance as die-cast metal articles. Heretofore, however, it has been considered extremely difficult to apply coloring to metal plated plastic article by printing or painting, thereby to display marks, designs, patterns, etc. The reason is that ordinary printing or painting on a hard, smooth metal plated surface results in the low adhesivity of applied coatings, so such coatings readily come off. For improved adhesivity, there may be contemplated the method of applying baked painting. However, synthetic resins permitting plating are generally of thermoplastic type, so that baked painting is not applicable to such resins. The conventional practice, therefore, is to engrave required marks, designns or patterns in the texture of plastic article, apply metal plating on said texture and pour paint materials into the depressions formed in the plated surface so as to effect coloring.

With the prior art process, however, paintings simply attach themselves to the metal plated surface of plastic article and are not firmly bonded. Accordingly, where the plastic articles are used under severe conditions or continuously over a long period, paintings are sometimes likely to come off. The conventional practice is further handicapped by low manufacturing efficiency and is not adapted for quantity production.

If painting is not applied on the metal plated surface, but on the surface of plastic article itself, the paint material will have improved adhesivity and be saved from the possibility of coming off. Accordingly, it may be contemplated to apply first printing or painting directly on the surface of plastic article and then carry out metal plating thereof. However, this process raises various problems for the reasons given below.

The general practice of plating plastic article is performed in two steps; that is, first by precipitating a metal layer on the surface of said article by chemical plating to render it electrically conductive and then introducing current through said metal coating to apply ordinary electroplating. This chemical plating requires sufficient precipitation of metal and its firm adhesivity to plastics, thus making it necessary to roughen the surface of plastic article so as to make it more hydrophilic. Since, however, the surface of plastics is generally extremely hydrophobic as it is, it has to be roughened and made hydrophilic by immersion in an etching solution before it can be subjected to chemical plating. An etching solution for plastics which generally have great chemical resistance should consist of strong oxidizing acids such as a mixture of sulfuric and chromic acids or sulfuric, chromic and phosphoric acids. Such etching solution damages most organic substances so that general ink and paint materials can not withstand a surface roughening treatment using such strong acids, thus either decomposing themselves, or if not destroyed, having their surface as much roughened as that of the plastic article and most likely plated in the succeeding plating process. Accordingly, the conventional process of directly applying printing or painting to the surface of plastic article so as to display marks, designs, patterns, etc. in colors and thereafter plating said surface is encountered with the aforementioned difficulties.

It is well and widely practiced industrially to chemical-plate such a polymer containing butadiene units as ABS resin (acrylonitrile-butadiene-styrene resin). Such polymer is well metal plated because the butadiene units contained therein are easily dissolved by an etching solution, forming countless tiny concaves on the surface of the polymer article, and the plating metal intimately and firmly sticks onto the concaves.

Synthetic resins other than those containing as an ingredient butadiene units can, of course, be metal plated when it is contacted with a chemical plating solution, though the plating metal fails to so firmly adhere to the surface of the synthetic resin articles. As a result, it is necessary with a partial metal plating method of the prior art to first apply on the surface of the plastic article of a polymer e.g. ABS resin a stop-off coating containing a synthetic resin which is not affected by etching solution, then chemcal-etch the plastic article with an etching solution, and finally activate the article with a solution containing palladium. These steps done, the plastic article is metal plated all over its surface, but the plating metal does not stick so firmly onto the stop-off coating as onto the ABS resin surface. This helps the stop-off coating easily to be removed from the plastic article by either a chemical or a mechanical step, thus achieving partial metal plating of a plastic article.

This prior art method, however, has many drawbacks. First, it cannot make a delicate and intricate plated design; secondly, the metal covering the stop-off coating is consumed for nothing; thirdly, the additional step of removing the stop-off coating results in a higher cost of the resultant products; and last, it cannot form on the plastic article plated and multi colored non-plated layers at the same time.

SUMMARY OF THE INVENTION

The object of the present invention is to provide an inexpensive plastic article covered with metal plated layers and non-plated layers, at least one of said non-plated layers being colored.

The other object of the present invention is to provide a plastic article having on its surface an intricate colored design which does not overlap the metal plated layers.

The plastic article according to the present invention is covered all over its surface with metal plated and non-plated layers, some or all of said non-plated layers being colored. The plastic article with said plated and non-plated layers is manufactured in the following manner. The article coated selectively and partially with many protective films, treated with an etching solution containing at least 50 g/l of chromic anhydride ($CrO_3$), activated with a solution containing palladium, chemically metal-plated and electrically metal-plated; at least one of said protective films containing a coloring material, and each protective film containing a synthetic resin selected from the group consisting of polyvinyl chloride, polyvinyl acetate, vinyl chloride-vinyl acetate copolymers, and ethylene-vinyl acetate copolymers and occupying more than 60 weight percent of the film.

DETAILED DESCRIPTION OF THE INVENTION

The novel plastic article of this invention is distinguishable from those prepared in the conventional methods in that it undergoes the following two specific steps. First it is coated with protective films the primary component of which is a specific synthetic resin, and secondary it is immersed in an etching solution containing at least 50 g/l of $CrO_3$.

The protective film, which has specifically been described in the preceding paragraphs has been found by the inventor of this invention to have an excellent corrosion resistance against the etching solution. It has also been found that the protective film never permits the plating metal to stick on it once it has been formed on the plastic article of a polymer containing butadiene units which are easily etched by the etching solution to roughen the article surface and immersed in an etching solution containing at least 50 g/l of $CrO_3$. Consequently, it is possible with the present invention to achieve partial metal plating of a plastic article without knotty and troublesome removal of the protective film. The stop-off coating of the prior art is disadvantageous since it should be removed from the surface of the article after the chemical plating process. Further since the protective film can contain a color material, its use helps produce, without any complicated process, plastic articles having on their surface intricate colored designs. In these respects, the use of the protective film of this invention is a great technical advancement to the partial metal-plating of plastic articles.

In the generally practised partial metal-plating of plastic articles, an article is treated with an etching solution so that its surface is roughened, dipped in an activating solution to have a palladium film deposited on its etched surface, bathed in the chemical plating solution to be chemical-plated with a thin layer of the plating metal, and finlly electroplated with a thicker layer of the metal.

The inventor of the present invention has ascertained that if a plastic article partially covered with the aforementioned protective film is immersed in an etching solution containing at least 50 g/l of $CrO_3$, no palladium is deposited on the protective films, and only chromium (Cr) is on the films. This phenomenon takes place, because chromium allegedly prevents palladium from sticking to the protective film. Thanks to this phenomenon, the plating metal does not adhere to the protective film but firmly stays on that surface of the article which is not covered with the protective films.

Preferably, the etching solution containing at least 50 g/l of $CrO_3$ is prepared by dissolving chromic anhydride ($CrO_3$) in water and adding sulfuric acid into the $CrO_3$—$H_2O$ solution. Instead of chromic anhydride, a chromate such as potassium chromate may be employed. The etching solution tends to have a lower content of sulfuric acid as the content of $CrO_3$ increases. It is therefore preferable in the present invention that the plastic article partially covered with the protective film be etched in a chromic acid-sulfuric acid mixture with a smaller content of $CrO_3$ i.e. with a larger content of $H_2SO_4$, and again etched in a chromic acid-sulfuric acid mixture with a larger content of $CrO_3$. This is because if the plastic article is etched only a single time in an etching solution containing at least 50 g/l of $CrO_3$ (that is, an etching solution with a great content of $CrO_3$), the content of $H_2SO_4$ is so small that the etching solution fails to fully dissolve the butadiene units to roughen the surface of the plastic article, adversely lowering the adherence of the plating metal onto the etched surface of the article.

The polymer containing butadiene units and employed in this invention may be acrylonitrile-butadiene-styrene resin, methyl methacrylate-butadiene-styrene resin, acrylonitrile-chlorinated polyethylene-styrene resin or polypropylene.

The protective film of this invention may be formed from a paint consisting of an organic solvent and solid ingredients including the above-mentioned synthetic resin. The paint is coated on the desired surface portions of the plastic article and dried thereafter to become the protective film. The solid ingredients, which largely form the protective film, are a synthetic resin selected from the group consisting of polyvinyl chloride, polyvinyl acetate, vinyl chloride-vinyl acetate copolymers and ethylene-vinyl acetate copolymers; a coloring material such as pigment; other synthetic resins or additives such as a plasticizer and stabilizer. The solvents may consist of acetone, methylethyl ketone, methylisobutyl ketone, diacetone alcohol, tetrahydrofuran, n-hexane, toluene, cyclohexanone, isophorone, dioxane, ethyl acetate, butyl acetate and octyl acetate.

Organic pigments color the protective film much more than inorganic pigments. More precisely, where an organic pigment necessarily occupies 15 weight percent of the protective film, an inorganic pigment should occupy as much as 30–40 weight percent. Whichever coloring material is used, it should not occupy more than 30 weight percent of the protective film, becase the coloring material, if contained in so great a quantity, tends to be disclosed by the etching solution. In addition, the presence of a coloring material in so large a content in the protective film results in a stronger adherence of the plating metal to the plastic article. Accordingly, the content of the coloring material in the protective film should preferably be less than 20 weight percent.

In case that the plastic article is to have a plurality of protective film of different colors, it is required that the contents of coloring material in the films be substantially equal. It should therefore be avoided that the contents of coloring materials in the films differ by more than 15 weight percent. Care should be taken particularly when inorganic white or black pigment is necessarily used to color a protective film while the other films are tinted with organic pigments; there is no organic white or black pigment.

Some, of coloring materials, such as organic pigments of phthalocyanine series, inorganic pigments having lead in its molecules e.g. chrome yellow ($PbCrO_4$), red lead ($Pb_3O_4$) and chrome orange ($PbCrO_4 \cdot PbO$) make the protective films repellent to the plating metal. It is therefore desirable to incorporate these pigments as coloring materials into the protective films according to this invention to help easily achieve the partial metal plating of plastic articles.

For improved performance, synthetic resin paints are generally denatured by adding fatty acids and resin oils or contain large amounts of plasticizer or stabilizer.

Since, however, such additives tend to cause a protective film including them to be readily plated, the present invention requires such film preferably to contain as little as possible of such additives as well as coloring materials.

|  | Electrolyte Composition | | Conditions of Plating | |
|---|---|---|---|---|
|  |  | g/l |  |  |
| Electroplating of copper | Copper sulfate | 220 | Temperature | 25° to 30° |
|  | Sulfuric acid | 50 | Current density at cathode | 3.5 to 6.5 A/dm² |
|  | Hydrochloric acid | 50 | Current density at anode | 1.8 to 3.5 A/dm² |
|  | Lustering agent | 5 |  |  |
| Electroplating of nickel | Nickel sulfate | 260 | pH | 3.8 to 4.2 |
|  | Nickel chloride | 50 | Temperature | 45° to 55°C |
|  | Boric acid | 50 | Current density at cathode | 1 to 5 A/dm² |
|  | Sodium naphthalene trisulfonate | 5 |  |  |
| Electroplating of chromium | Chromic acid | 250 | Temperature | 43° to 45°C |
|  | Sulfuric acid | 2.5 | Current density | 10 to 40 A/dm² |
|  | Selenic acid | 0.013 |  |  |

For this reason, the synthetic resin preferably occupies more than 60 weight percent of the solid ingredients of the paint which, when dried, becomes a protective film. Said protective film may be adhered on the surface of the plastic article in the form of a thin sheet or a chip, instead of formed on the article from a paint coated and dried thereon.

The present invention will be more fully understood by reference to the following examples.

EXAMPLE 1

There was coated on the surface of a rectangular rule-like plate made of ABS resin a paint consisting of 28g of vinyl chloride-vinyl acetate copolymers, 2g of blue pigments for synthetic resins, 30g of methylethyl ketone and 40g of toluene to draw rule graduations spaced 1 mm from each other. The mass was immersed 10 minutes in an etching solution at 60°C to roughen the non-coated portions of the surface. The etching solution used consisted of a mixture of 400 c.c. of sulfuric acid (specific gravity 1.84), 100g of potassium dichromate and 600 c.c. of water. After the surface roughening operation, there as conducted chemical plating of copper according to ordinary practice. Namely, the subject plate treated in the aforementioned manner was immersed 5 minutes in a sensitizing solution prepared by dissolving 10g of stannous chloride in a mixture of 5 c.c. of hydrochloric acid and 1000 c.c. of water, followed by water washing and then 2 minutes in an activating solution prepared by dissolving 0.5g of palladium chloride in a mixture of 10 c.c. of hydrochloric acid and 1000 c.c. of water, thereby to activate the surface. Thereafter the plate was immersed 10 minutes in a chemical copper plating solution at 20°C to be chemically plated with copper. The chemical copper platingn solution was prepared from 10g of copper sulfate, 25g of Rochelle salt, 15g of caustic soda, 10g of paraformaldehyde and sufficient amounts of water to bring the entire solution to one l. After chemical copper plating, the ABS resin plate was plated with copper to reddish brown. However, copper was not precipitated on those portions of the surface of said plate which were coated with the aforementioned paint, so that the pattern drawn by said paint displayed a distinct blue color. Thereafter the plate was finished by being plated with copper, nickel and chromium in turn according to an ordinary electroplating process. The electroplating was carried out under the following conditions:

The resulting plated rule plate presented distinct graduations formed of the blue paint.

EXAMPLE 2

There was molded an automobile wheel cover from ABS resin. The surface of the cover was printed with a red mark using a paint consisting of 10g of powdered polyvinyl chloride, 1g of red organic pigment, 10g of methylisobutyl ketone, 10g of acetone and 20g of toluene. Then the cover was immersed 10 minutes in an etching solution at 60°C prepared from 80 g/l of anhydrous chromic acid, 300 g/l of sulfuric acid and 80 g/l of phosphoric acid so as to be roughened on the surface. The cover was immersed 5 minutes in the same sensitizing solution as used in Example 1 and 2 minutes in an activating solution to be activated on the surface, followed by chemical plating of nickel. The solution used in said plating was composed of 40 g/l of nickel sulfate, 24 g/l of sodium citrate, 14 g/l of sodium acetate, 20 g/l of sodium hypophosphite and 5 g/l of ammonium chloride. After chemical plating of nickel, the printed mark remained red. The cover was finished by being electroplated with copper, nickel and chromium in turn as in Example 1. The red mark was distinctly left out, the remaining portions of the surface of the cover being fully plated with chromium.

EXAMPLE 3

An automobile wheel cover made of ABS resin was printed with a red mark using an ink material prepared by dissolving 300 parts of powdered polyvinyl cloride in a mixed solution of 300 parts of isophorone, 300 parts of cyclohexanone, 200 parts of toluene, 100 parts of ethyl acetate and 50 parts of dioctyl phthalate as plasticizer and 20g of cadmium red as red pigment. The wheel cover was immersed 5 minutes in a first etching solution at 50°C consisting of 600 cc/l of chromic anhydride and 400 cc/l of water and then 10 minutes in a second etching solution at 50°C prepared from 206 cc/l of sulfuric acid, 424 g/l of chromic anhydride and 689 cc/l of water to be etched on the surface. After water washing, the wheel cover was immersed 2 minutes in a catalyzer solution prepared by mixing 2.1g of palladium chloride, 184g of stannous chloride and 550 c.c. of hydrochloric acid and, after heating the solution, adding 5 parts of water and one part of hydrochloric acid to one part of said solution, so as to be plated with metal on the surface. Thereafter the wheel cover was immersed 5 minutes in an aqueous solution consisting of 200 c.c. of hydrochloric acid and 800 c.c. of water. After water washing, the cover was immersed 10 minutes in an electrolyte for chemical plating of nickel so as to be chemically plated with nickel. The electrolyte was composed of 25 g/l of nickel sulfate, 25 g/l of sodium hypophosphite, 30 g/l of sodium citrate, 45 g/l of potassium pyrophosphate, 45 g/l of ammonium chloride, 9 g/l of caustic soda and 15 c.c/l of ammonium water. Though the cover as a whole was plated with nickel to present a gray color, the printed portions alone remained red. The cover was further electroplated with copper, nickel and chromium in turn in the same manner as in Example 1, obtaining a product bearing a red mark which presented a similar external appearance to that of a wheel cover entirely made of metal.

EXAMPLE 4

Plating was performed in the same manner as in Example 1 excepting that there was used a rule-like plate made of methyl methacrylate-butadiene-styrene series resin instead of ABS resin, obtaining the same results.

EXAMPLE 5

Plating was performed in the same manner as in Example 1 excepting that there was used a rule-like plate made of acrylonitrile-chlorinated polyethylene-styrene series resin in place of ABS resin, obtaining the same results.

EXAMPLE 6

On the outside of a glass molded from ABS resin were pasted in mosaic form many-sided pieces cut out from red, blue and yellow thin sheets of polyvinyl chloride 0.2 mm thick using methylethyl ketone as a pasting agent. The glass was heated on the outside according to the ordinary plating process used in Example 1. In this case, the glass body was plated with metal, whereas those portions of the outer surface thereof on which there were pasted said cut pieces of thin polyvinyl chloride sheeting were not plated, obtaining such a beautiful glass as was not realized in the past.

EXAMPLE 7

There was molded a lamp shade from translucent ABS resin sheeting 1 mm thick. The surface of the lamp shade was printed with floral patterns using a red ink prepared by adding 10g red inorganic pigment (Cadmium Red), 5g of plasticizer DOP and 1g of organic tin stabilizer to 100g of polyvinyl chloride resin of paint grade. The inner wall of the lamp shade was coated with a transparent solution prepared by dissolving polyvinyl chloride resin in a solvent. The lamp shade was plated using the same manner as in Example 3, obtaining a product whose silvery plated surface presented red floral patterns.

EXAMPLE 8

A design was drawn on the surface of an ABS resin plate in blue paint consisting of 8g of vinyl chloride-vinyl acetate copolymers, 2g of Pthalocyanine Blue and 40g of cychlohexanone and in red paint consisting of 8g of said copolymers, 2g of Permanent Red and 40g of cychlohexanone. The ABS resin plate now with a design on its surface was dried at 60°C for 1 hour, and etched, being immersed for 30 minutes in an etching solution consisting of 500 cc/l of sulfuric acid and 40 g/l chromic anhydride heated to 65°C. Having been etched, the ABS resin plate underwent the same chemical copper plating as was conducted in Example 1. It was found upon said chemical copper plating that a copper layer was deposited partially on the red paint, not at all on the blue paint. Thereafter, the ABS resin plate was immersed for 15 minutes in a solution, a mixture of 200 cc/l of sulfuric acid and 400 g/l of chromic anhydride, heated to 60°C, and again immersed in the chemical copper plating solution for 10 minutes at 20°C. This time, a copper layer was formed neither on the blue paint nor on the red paint. This evidences that Pthalocyanine Blue contained in the blue paint makes the blue paint repellent against the plating metal.

EXAMPLE 9

An ABS resin plate was partially coated with a red paint consisting of 8g of vinyl chloride-vinyl acetate copolymers, 2g of Permanent Red and 40g of cyclohexanone, and with a white paint consisting of 6g of said copolymers, 4g of Titanium White and 40g of cyclohexanone. The red and white paints coated on the ABS resin plate were then dried at 60°C for 1 hour. After this drying, the ABS resin plate was immersed for 20 minutes at 65°C in an etching solution consisting of 600 cc/l of sulfuric acid, 15 g/l of chromic anhydride, and further immersed for 10 minutes at 60°C in a solution consisting of 200 cc/l of sulfuric acid and 400 g/l of chromic anhydride. The resin plate then underwent the same chemical copper plating as practiced in Example 1. As a result, the white paint was much discolored and partially deposited with a copper layer, though the red paint was not plated with a copper layer. Upon this finding, the inventor reduced the amount of titanium white contained in the white by 50 percent, i.e. 2g, and coated the white paint with less Titanium White on the ABS plate, which was dried, etched and immersed in the sulfuric acid-chromic acid acid-solution and in the chemical copper plating solution in the same manner. This time no copper layer was formed on the white paint.

COMPARATIVE EXAMPLE

An ABS resin plate screen printed with a red mark of the ink as used in Example 3 was etched for 10 minutes at 60°C in an etching solution consisting of 800 g/l of sulfuric acid, 30 g/l of chromic anhydride and 200 g/l of water. The resin plate is then fully washed with water and chemical-plated in the same manner as in Example 3. Contrary to a result the inventor had been expecting, a nickel layer was deposited on the red mark.

What is claimed is:

1. A plastic article whose surface is partly metal plated and partly ornamented by colored unplated areas, wherein a colored layer comprising coloring material and synthetic resin is formed partially on the surface of the plastic article, said article being subjected to etching, sensitizing, activating, electroless metal plating, and electroplating in the order mentioned, said plastic article being made of a polymer selected from the group consisting of acrylonitrile-butadiene-styrene resin, methyl methacrylate-butadiene-styrene resin, acrylonitrile-chlorinated polyethylene-styrene resin, and polypropylene, and said synthetic resin contained in said colored layer being selected from the group consisting of polyvinyl chloride, polyvinyl acetate, vinyl chloride-vinyl acetate copolymers, and ethylene-vinyl acetate copolymers;
  characterized in that said synthetic resin constitutes more than 60 percent by weight of the solid ingredients of said colored layer.

2. The plastic article of claim 1 wherein said colored layer is made from paint containing organic solvent, said coloring material and said synthetic resin.

3. The plastic article of claim 1 wherein said colored layer is made from a sheet or chip formed of said coloring material and said synthetic resin.

4. The plastic article of claim 1 wherein the content of coloring material in said colored layer is less than 20 weight percent.

5. The plastic article of claim 1 wherein said coloring material is selected from the group consisting of phthalocyanine organic pigment and lead containing inorganic pigment.

* * * * *